US007281695B2

(12) United States Patent
Jordan

(10) Patent No.: US 7,281,695 B2
(45) Date of Patent: Oct. 16, 2007

(54) PIVOTABLE SUSPENSION ELEMENT

(75) Inventor: Matthew Edward Jordan, West Yorkshire (GB)

(73) Assignee: Access Technologies Limited, West Midlands (GB)

( * ) Notice: Subject to any disclaimer, the term of this patent is extended or adjusted under 35 U.S.C. 154(b) by 156 days.

(21) Appl. No.: 11/068,823

(22) Filed: Mar. 2, 2005

(65) Prior Publication Data
US 2005/0194758 A1 Sep. 8, 2005

(30) Foreign Application Priority Data
Mar. 2, 2004 (GB) .................................. 0404618.1
Jan. 4, 2005 (GB) .................................. 0500010.4

(51) Int. Cl.
E04G 3/00 (2006.01)
(52) U.S. Cl. ............................. 248/274.1; 248/231.41; 248/231.71; 248/288.31; 248/288.51; 248/323; 248/324; 248/317; 248/328; 248/65; 248/72; 248/74; 248/74.4; 248/70; 294/74; 403/130; 403/131; 403/337; 403/387; 606/61
(58) Field of Classification Search ........... 248/231.41, 248/231.71, 72, 74, 328, 73, 74.4, 65, 67.7, 248/67.5, 317, 288.31, 288.51, 70, 274.1, 248/323, 324; 403/337, 387, 130, 131; 294/74; 606/61
See application file for complete search history.

(56) References Cited
U.S. PATENT DOCUMENTS

| 1,654,383 | A |   | 12/1927 | Parrish ........................ 248/72 |
| 1,840,216 | A | * | 1/1932 | Tormo ......................... 248/72 |
| 3,572,623 | A | * | 3/1971 | Lapp ........................... 248/72 |
| 4,946,458 | A | * | 8/1990 | Harms et al. ................. 606/61 |
| 5,344,422 | A | * | 9/1994 | Frigg ........................... 606/61 |
| 7,056,053 | B2 | * | 6/2006 | Schilling et al. ............ 403/337 |
| 7,073,754 | B2 | * | 7/2006 | Shuey .......................... 248/72 |
| 2006/0065805 | A1 | * | 3/2006 | Barton et al. ............... 248/317 |

FOREIGN PATENT DOCUMENTS

| FR | 0677689 | * | 3/1995 |
| GB | 1 405 931 |   | 9/1975 |
| WO | WO 03/073574 A2 |   | 9/2003 |

* cited by examiner

Primary Examiner—Carl D. Friedman
Assistant Examiner—Todd M. Epps
(74) Attorney, Agent, or Firm—Young & Thompson

(57) ABSTRACT

A pivotable suspension element includes a support member having a part-spherical bearing surface clamp element and a body portion, the body portion having an integral formation of a slot to receive a part of a component to which the pivotable suspension element may be secured; a locator formation for the clamp element whereby, in use, the clamp element may be operated to clamp a flange in the slot; a part-spherical seat, and a through-passage extending through the body from the part-spherical seat, wherein the curvature of the part-spherical seat of the body portion corresponds substantially with that of the bearing surface of the support member and wherein the cross-sectional size of the through-passage increases in a direction away from the part-spherical seat.

22 Claims, 2 Drawing Sheets

PIVOTABLE SUSPENSION ELEMENT

BACKGROUND OF THE INVENTION

This invention relates to a pivotable suspension element and in particular, though not exclusively, to a pivotable suspension element suitable for securing to a supporting flange, such as a flange of an I beam girder and to allow a component to be pivotally supported relative to the supporting flange.

Many types of pivotable suspension elements are known and examples are to be found in, for example, the publications of EP 677689A and EP 1165995A. These types of pivotable suspension elements have in common the provision of a hinge pin to allow, in use, for relative pivotal movement of two components inter-connected by the pivotable suspension element.

Although said known types of pivotable suspension elements have been employed for many years, and have been the subject of many modifications and improvements, the designs have always needed to ensure that the hinge pin is held securely, that the shear strength of the pin and pin support is adequate, and also that it will remain so after potentially long periods of pivotal movement and/or exposure to unfriendly environmental conditions.

Additionally, the number of component parts required to construct the pivotable suspension elements of the aforedescribed type, and the associated assembly time in manufacture results in the product being relatively expensive.

SUMMARY OF THE INVENTION

The present invention seeks to provide a pivotable suspension element in which at least some of the aforedescribed problems are mitigated or overcome.

In accordance with one aspect of the present invention a pivotable suspension element comprises a support member having a part-spherical bearing surface, clamp means and a body portion, said body portion comprising an integral formation of:
- a slot to receive a part of a component to which the pivotable suspension element may be secured;
- a locator formation for the clamp means whereby, in use, the clamp means may be operated to clamp a flange in the slot;
- a part-spherical seat, and
- a through-passage extending through the body from said part-spherical seat, wherein the curvature of said part-spherical seat of the body portion corresponds substantially with that of the bearing surface of the support member and wherein the cross-sectional size of the through-passage increases in a direction away from said part-spherical seat.

The support member may be provided with a through-passage in the form of a through-bore in communication with the part-spherical bearing surface, and arranged, in use, for location of an elongate suspension member. Said through-bore may be cylindrical or may, for example, be of a cross-section which decreases from a maximum at the part-spherical surface to a minimum at a remote surface of the support member, the dimension of the through-bore at said remote surface preferably corresponding substantially with the cross-sectional dimension of the elongate suspension member.

In an alternative embodiment the support member may be formed integrally with an elongate suspension member.

Preferably the part-spherical seat of the body portion is concave and the part-spherical bearing surface of the support member is convex. However the invention does not exclude the possibility of the part-spherical seat of the body portion being convex and the support member having a concave bearing surface.

As considered in the direction of the length of the through-passage, the body portion may define a pair of end faces which, in use, typically are upper and lower faces. The part-spherical seat of the body portion may extend in said length direction to a position aligned with an end face, for example that end face which serves, in use, as an upper face. Alternatively the part-spherical surface may lie inset from said end face and, in one example, may lie at a position at which the major diameter of the part-spherical surface lies substantially mid-way between said end faces. In a further alternative the body portion may be provided with a pair of substantially part-spherical bearing surfaces, with said surfaces being disposed in a back to back manner. In that case the body portion may comprise a through-passage which increases in each direction from a part-spherical bearing surface to a respective one of the two end faces.

The locator formation for the clamp means may comprise a screw-threaded passage formed in the body portion and extending into communication with the slot. Clamp means, such as a screw-threaded bolt, may be provided in said screw-threaded aperture and a lock nut may be provided whereby the bolt may be locked in a position at which the flange of a support member is clamped in the slot and held firmly in that configuration.

The screw-threaded passage or like locator formation preferably extends in a direction parallel with the length direction of said through passage of the body portion.

The body portion may comprise more than one locator formation. It may comprise two locator formations positioned respectively in two sections of the body portion which define said slot. Thus, in use, to secure to a horizontal flange section of a beam, depending on which is the more convenient for installation purposes a screw-threaded bolt, or other form of clamp means, may be operable from either above or below the flange to cause the clamp means to bear firmly against the flange. In one example of the invention each of two locator formations may comprise a screw-threaded passage, and said passages may be positioned axially aligned with one another.

An elongate suspension member may have a screw-threaded end region in the case of a suspension member which extends through a through-bore in the support member. A lock nut arrangement may be provided at said screw-threaded end whereby the effective suspension length of the elongate suspension member may be adjusted in situ and retained securely in that adjusted position.

In use of the aforedescribed pivotable suspension element the elongate suspension member is free to pivot relative to the body portion by virtue of relative sliding movement between the confronting part-spherical surfaces.

In accordance with another aspect of the present invention there is provided the combination of a pivotable suspension element of the invention and wherein the support member has a through bore, and an elongate suspension member which extends through said through-bore and has a screw-threaded end region.

A further aspect of the present invention provides the combination of a pivotable suspension element of the invention and an elongate suspension member which extends through said through-bore, wherein the dimension of the through-bore at said remote surface of the support member corresponds substantially with the cross-sectional dimension of the elongate support member.

BRIEF DESCRIPTION OF THE DRAWINGS

Embodiments of the present invention will now be described, by way of example only, with reference to the accompanying diagrammatic drawings which:

FIG. 3 is a plan view of the pivotable suspension element of. FIG. 2, and

DETAILED DESCRIPTION OF THE PREFERRED EMBODIMENTS

Figure 1:
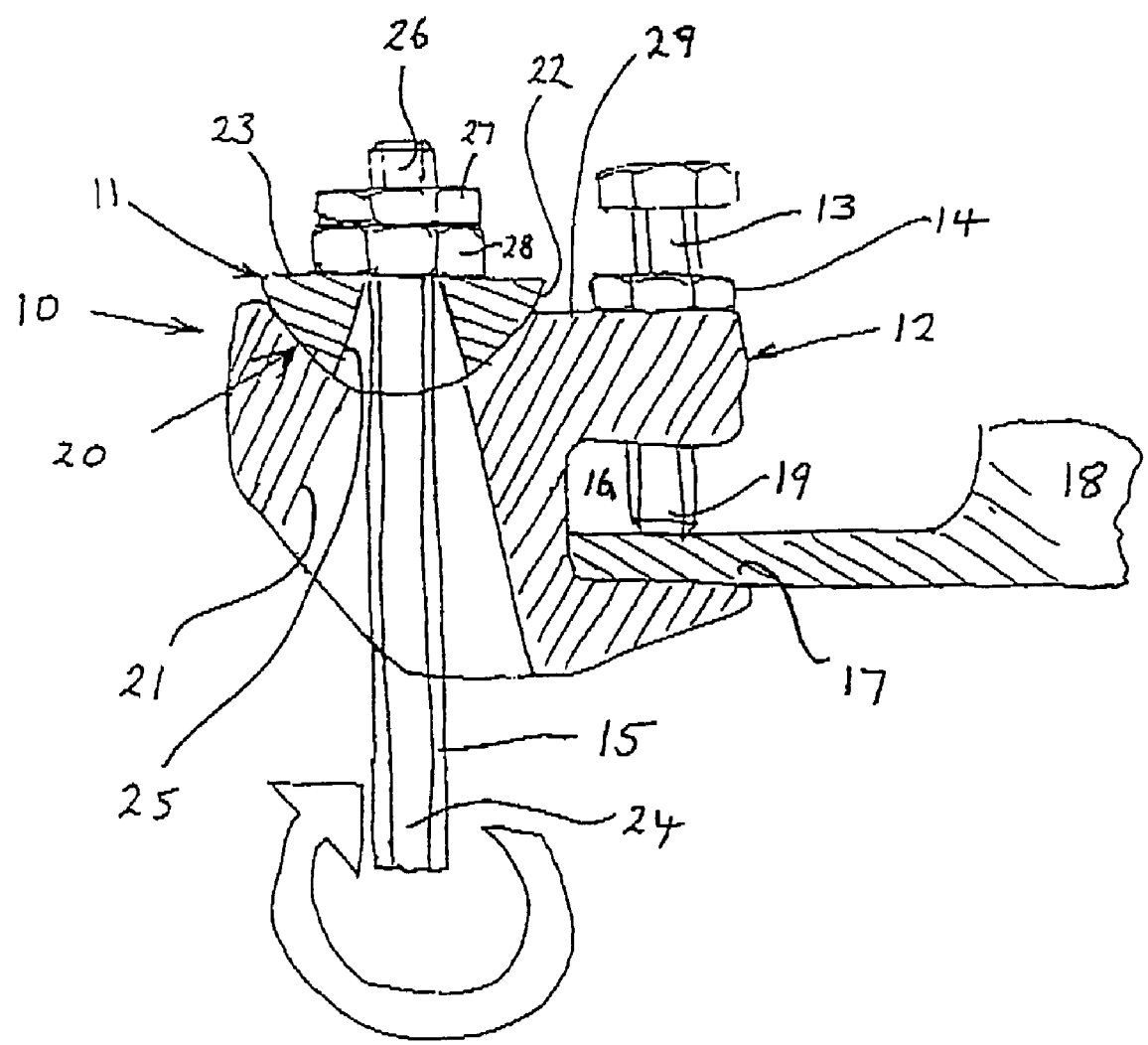
FIG. 1 is a pivotable suspension element of the invention secured to a support structure, some of the elements being in cross-section.

The pivotable suspension element 10 comprises a support member 11 in the form of a hemispherical washer, a body formation 12, a bolt 13 and lock nut 14 which acts as clamp means. The element 10 is shown in combination with an elongate suspension rod 15. The body 12 is of an integral construction formed by casting or moulding of metal or plastics material. The body 12 defines a slot formation 16 into which the edge region of a flange 17 of a support I beam 18 may be located. The clamp bolt 13 extends through a through-bore provided in the body 12 at a position aligned with the slot 16 whereby the distal end 19 of the bolt may be brought into firm, clamping contact with the flange 17 to hold the flange firmly in the slot 16. The lock nut 14 is provided to ensure that the bolt 13 is retained in position.

The body 12 comprises a part-spherical concave bearing seat surface 20, and a through-bore 21 of a frusto-conical shape extends through the body, increasing in cross-sectional size in a direction away from the bearing surface 20. The maximum diameter of the surface 20, at the upper, open end region, is coincident with an upper end face 29 of the body 12.

The support member 11 comprises a part-spherical convex bearing surface 22 of a curvature corresponding to that of the part-spherical bearing seat 20 of the body 12.

In this embodiment the support member washer 11 additionally comprises a through-bore 25 of a frusto-conical shape which increases in a direction from an upper side 23 of the washer in a direction towards the part-spherical bearing surface 22.

The suspension rod 15 is screw-threaded along the whole of its length and extends through the aforementioned through-bores 21, 25. The upper end 26 of the suspension rod is provided with a pair of nuts 27, 28 which may be employed as lock nuts selectively adjustable to determine the free length of the suspension rod as suspended below the body 12.

The component which is to be suspended pivotally relative to the support 18 by means of the pivotable suspension element 10 is secured in a conventional manner to the lower end 24 of the suspension rod 15.

In use, the facility for relative sliding movement of the confronting bearing surfaces 20, 22 and the frusto-conical shape of the through-passage 21 of the body part 12 readily facilitates the desired pivotal freedom without requiring provision of conventional hinge pins or the like.

Furthermore, because the through-bore 21 may be provided at a position substantially vertically aligned with the slot 16 and flange 17, as viewed in the accompanying drawing, the supported component may be supported at a position close to the flange 17. This contrasts with conventional constructions in which the or each pivot pin lies vertically below the flange and thus the minimum distance by which a component may be suspended beneath the flange necessarily is much greater.

Figure 2:
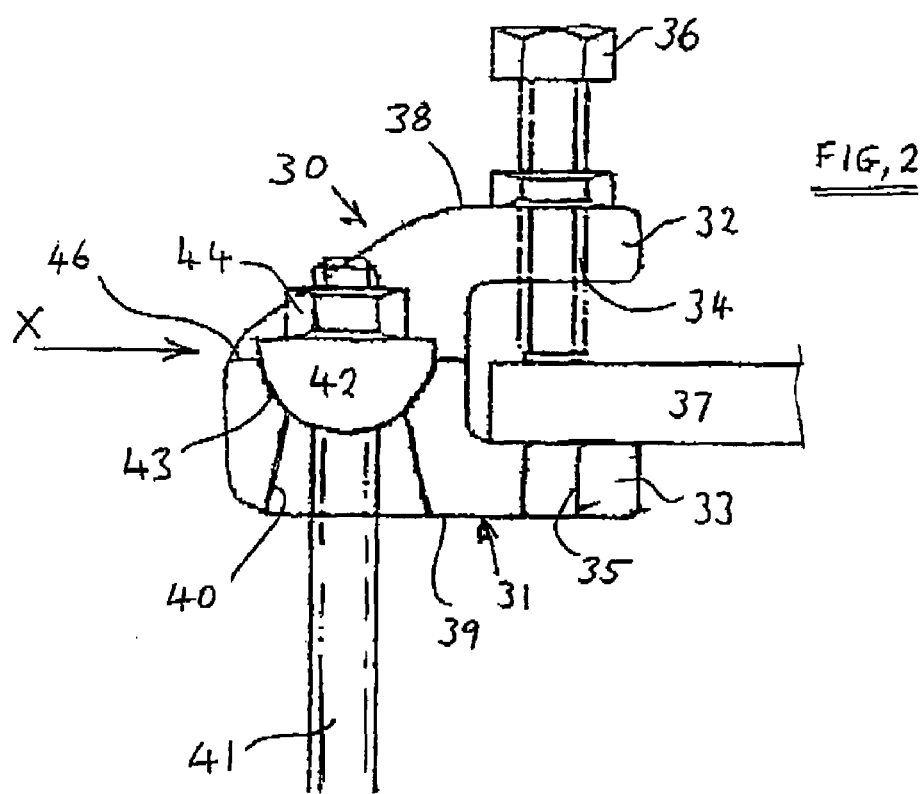
FIG. 2 is a cross-section of a pivotable suspension element in accordance with another embodiment of the invention and shown secured to a support structure.

In the embodiment shown in FIG. 2 the pivotable suspension element 30 is of a construction substantially similar to that of FIG. 1 but the body portion 31 comprises two regions 32, 33 which define the slot and are each provided with a screw-threaded aperture 34, 35 through either of which the clamp bolt 36 may extend and be operated to bear firmly against a flange 37 relative to which it is wished to secure the pivotable suspension element.

The body 30 comprises a pair of end faces 38, 39 which lie at the axial extremities of the body portion as considered relative to the direction of the length of the through-passage 40 defined by the body 31 for the purpose of allowing pivotal movement of a suspension rod 41 secured to the support member 42. In this embodiment, in contrast to that of FIG. 1, the part-spherical bearing surface 43 defined by the body 31 has the maximum diameter thereof positioned in a plane 46 substantially mid-way between the aforementioned axial end faces 38, 39. In consequence, it is possible to provide that the upper end of the suspension rod 41 and associated lock nuts 44 also lie within the distance between said end faces thereby to provide an overall assembly having a degree of compactness which may be advantageous in some installation situations.

Figure 3:
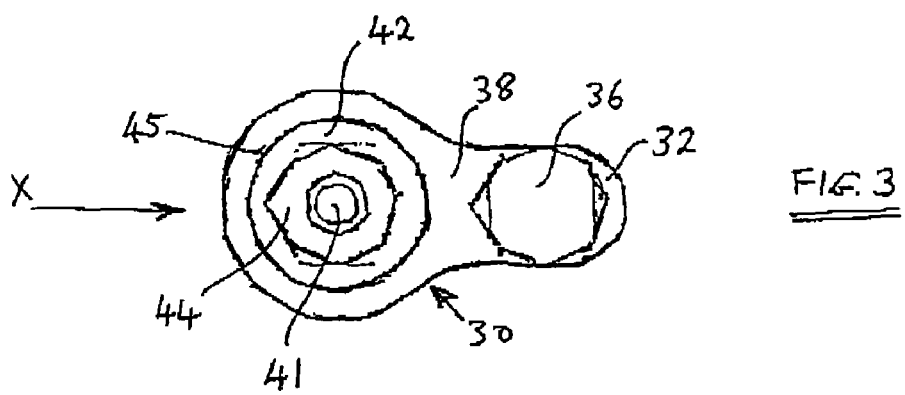

In the embodiment of FIGS. 2 & 3 the body portion is shaped to provide a recess zone 45 (see FIG. 3) to allow access to the upper end of the suspension rod 41 and associated lock nuts. The material of the body portion 31 is shaped such that a lock nut is not wholly surrounded and may be accessed in the direction of the arrow "x" such that in an installation having limited height availability the lock nuts may be adjusted from a sidewards direction, between the end faces 38, 39, by means of ring spanners.

Figure 4:
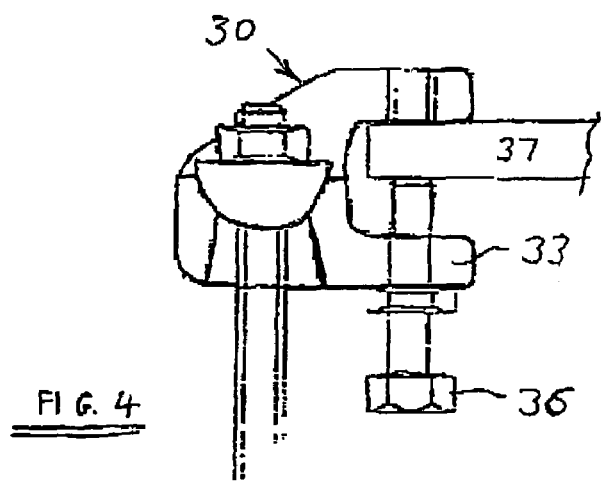
FIG. 4 shows the pivotable suspension element of FIG. 2 secured to a support structure in an alternative manner.

FIG. 4 shows the pivotal suspension element 30 of FIGS. 2 and 3 arranged with the clamp bolt 36 extending through the lower body portion section 33, and co-operating with a flange 37 in a manner corresponding to that described above with reference to FIGS. 2 & 3.

The invention claimed is:

1. A pivotable suspension element comprising a support member having a part-spherical bearing surface, clamp means and a body portion, said body portion comprising an integral formation of:
   a slot to receive a part of a component to which the pivotable suspension element may be secured;
   a locator formation for the clamp means whereby, in use, the clamp means may be operated to clamp a flange in the slot;
   a part-spherical seat, and
   a through-passage extending through the body from said part-spherical seat,
   wherein the curvature of said part-spherical seat of the body portion corresponds substantially with that of the bearing surface of the support member and said part-spherical seat of the body portion is subject to the weight of a supported load carried by the support member, and wherein the cross-sectional size of the through-passage increases in a direction away from said part-spherical seat.

2. A pivotable suspension element according to claim 1, wherein the support member is provided with a through-passage in the form of a through-bore in communication with the part-spherical bearing surface for location of an elongate suspension member.

3. A pivotable suspension element according to claim 2, wherein said through-bore is cylindrical.

4. A pivotable suspension element according to claim 2, wherein said through-bore is of a cross-section which decreases from a maximum at the part-spherical surface to a minimum at a remote surface of the support member.

5. A pivotable suspension element according to claim 1, wherein the part-spherical seat of the body portion is concave and the part-spherical bearing surface of the support member is convex.

6. A pivotable suspension element according to claim 1, wherein the body portion comprises two locator formations positioned respectively in two sections of the body portion which define said slot.

7. A pivotable suspension element according to claim 1, wherein each locator formation for the clamp means comprises a screw-threaded passage formed in the body portion and extending into communication with the slot.

8. A pivotable suspension element according to claim 7, wherein the clamp means comprises a screw-threaded bolt provided in a said screw-threaded aperture and a lock nut whereby the bolt may be locked in a position at which the flange of a support member is clamped in the slot and held firmly in that configuration.

9. A pivotable suspension element according to claim 1, wherein each locator formation extends in a direction parallel with the length direction of said through passage of the body portion.

10. A pivotable suspension element according to claim 1, wherein the support member is formed integrally with an elongate suspension member.

11. A pivotable suspension element according to claim 1, wherein as considered in the direction of the length of the through-passage of the body portion, said body portion defines a pair of end faces and the part-spherical seat of the body portion extends in said length direction to a position aligned with one of said end faces.

12. A pivotable suspension element according to claim 1, wherein as considered in the direction of the length of the through-passage of the body portion, said body portion defines a pair of end faces and the part-spherical seat of the body portion lies inset from said end faces.

13. A pivotable suspension element according to claim 12, wherein the major diameter of the part-spherical seat lies substantially mid-way between said end faces.

14. A pivotable suspension element according to claim 12, wherein the material of the body portion is shaped to define a recess whereby a space adjacent a surface of the support member may be accessed in a sideways direction between said end faces.

15. A pivotable suspension element according to claim 1, wherein the body portion is provided with a pair of said substantially part-spherical bearing seats disposed in a back to back manner.

16. A pivotable suspension assembly comprising a pivotable suspension element according to claim 1 and an elongate suspension member which extends through said through-bore and has a screw-threaded end region.

17. The assembly of claim 16, wherein a lock nut arrangement is provided at said screw-threaded end whereby the effective suspension length of the suspension member may be adjusted in situ and retained securely in that adjusted position.

18. A pivotable suspension assembly comprising a pivotable suspension element according to claim 4 and an elongate suspension member which extends through said through-bore, wherein the dimension of the through-bore at said remote surface corresponds substantially with the cross-sectional dimension of the elongate suspension member.

19. A pivotable suspension element comprising a support member having a part-spherical bearing surface, clamp means and a body portion, said body portion comprising an integral formation of:
  a slot to receive a part of a component to which the pivotable suspension element may be secured;
  a locator formation for the clamp means whereby, in use, the clamp means may be operated to clamp a flange in the slot;
  a pair of end faces;
  a through-passage extending through the body from one of said end faces to the other; and
  a part-spherical seat which lies inset from said end faces and through which said through-passage extends,
  wherein the curvature of said part-spherical seat of the body portion corresponds substantially with that of the bearing surface of the support member and wherein the cross-sectional size of the through-passage increases in a direction away from said part-spherical seat.

20. A pivotable suspension element according to claim 19, wherein the support member, when in sit with the bearing surface thereof in contact with said part-spherical seat, lies substantially wholly between said end faces.

21. A pivotable suspension element comprising a support member having a part-spherical bearing surface, clamp means and a body portion, said body portion comprising an integral formation of:
  a slot defined by the space between two sections of the body portion to receive a part of a component to which the pivotable suspension element may be secured;
  two locator formations for the clamp means, said two locator formations being positioned respectively in said two sections of the body portion whereby, in use, the clamp means may be associated with either of the two locator formations and operated to clamp a flange in the slot;
  a part-spherical seat; and
  a through-passage extending through the body from said part-spherical seat,
  wherein the curvature of said part-spherical seat of the body portion corresponds substantially with that of the bearing surface of the support member and wherein the cross-sectional size of the through-passage increases in a direction away from said part-spherical seat.

22. A pivotable suspension element according to claim 21, wherein the body portion comprises a pair of end faces at axial extremities thereof as considered in the direction of the length of the through-passage and said support member, when in sit with the bearing surface thereof in contact with said part-spherical seat, lies substantially wholly between said end faces.

* * * * *